J. L. WOODBRIDGE.
CAR AXLE LIGHTING SYSTEM.
APPLICATION FILED JUNE 30, 1913.
1,130,687.
Patented Mar. 2, 1915.
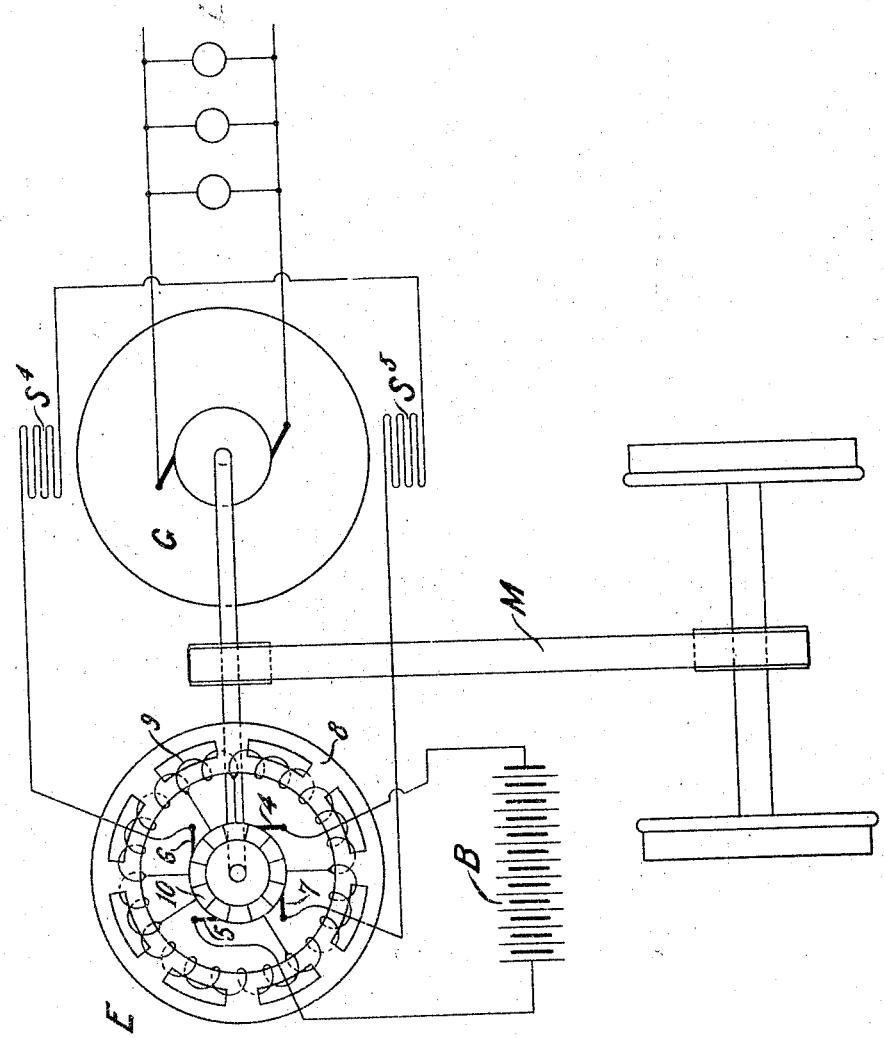
WITNESSES:
INVENTOR
Joseph L. Woodbridge
BY
Augustus B. Stoughton
ATTORNEY.

UNITED STATES PATENT OFFICE.

JOSEPH LESTER WOODBRIDGE, OF PHILADELPHIA, PENNSYLVANIA.

CAR-AXLE LIGHTING SYSTEM.

1,130,687.  Specification of Letters Patent.  Patented Mar. 2, 1915.

Original application filed January 10, 1908, Serial No. 410,259. Divided and this application filed June 30, 1913. Serial No. 776,551.

*To all whom it may concern:*

Be it known that I, JOSEPH LESTER WOODBRIDGE, a citizen of the United States, and resident of Philadelphia, in the county of Philadelphia and State of Pennsylvania, have invented certain new and useful Improvements in Car-Axle Lighting Systems, of which the following is a specification.

My invention relates to systems in which a generator driven at variable speed is used for supplying current to a constant potential circuit, as in the case of a generator for train lighting driven from the axle of the moving car, or a generator driven by a windmill at variable speed.

The principal object of my invention is to provide simple and reliable means for maintaining a constant potential at the generator terminals with widely varying speed changes.

Other objects as well as the general nature of my invention will be more clearly seen from the following description taken in connection with the accompanying drawing which is a diagrammatic view of an axle lighting system embodying features of the invention.

In the drawing, G is a direct current generator supplying current to the translating device L and driven at a variable speed by means of a belt M running on a pulley mounted on the car axle. On the same shaft as the generator armature, is mounted an exciter E. This exciter consists of a frame or core of magnetic material 8, on which is a winding 9, connected to a commutator 10, in the usual manner. To avoid confusion, only a few of the connections from the winding to the commutator are shown. Two pairs of brushes 4—5 and 6—7 bear upon this commutator at points displaced at an angle of 90°. One pair of brushes 4—5 is connected to a source of constant potential, here shown as a storage battery B. The other pair 6—7, is connected to the field windings $S^4$ and $S^5$, of the generator G. The operation of this apparatus is then as follows: Assume first that the generator G and the exciter E, are driven at a certain fixed speed; the battery will tend to send current through the armature winding 9 between the brushes 4—5. This current would become excessive were it not for the counter electro-motive-force developed in this armature by reason of its rotation in the field produced by the current output from the brushes 6—7, as explained below. Assume a small amount of current flowing in the armature winding 9 between the brushes 4—5. This current will produce a field whose axis will be in line with the brushes 4—5. This field will produce an electromotive-force across the brushes 6—7 and this electro-motive-force will send current through the field windings $S^4$ and $S^5$ of the generator G. The effect of this latter current, however, on the exciter E will be to produce a second field whose axis will be in line with the brushes 6—7, and this second field will produce a counter-electro-motive-force between the brushes 4—5 sufficient to prevent any further flow of current from the battery. It will be seen that for any given speed the flow of current from the brushes 6—7 through the field windings $S^4$ and $S^5$ will depend upon the voltage of the battery B, and will be sufficient to produce the field necessary to develop the counter-electro-motive-force required to balance that of the battery. If, however, the speed should increase a weaker field, and, therefore, a smaller amount of current from the brushes 6—7 will be required to produce the same counter-electro-motive-force. It will be seen, therefore, that as the speed of the generator and exciter varies, the current in the field windings $S^4$ and $S^5$ will vary in the opposite direction, thus maintaining constant voltage on the generator G, regardless of changes of speed. It will also be noted that if the direction of rotation reverses, the current in the field windings $S^4$ and $S^5$ will also reverse, so that the generator will maintain the same polarity.

This application is a division of my application, Serial No. 410,259, filed January 10th, 1908.

What I claim and desire to secure by Letters Patent is:

1. A dynamo and its exciter mechanically connected, a source of constant potential independent of the dynamo, and two sets of electrically displaced brushes for the exciter, whereof one set is connected to the source of constant potential and whereof the other is connected to the field windings of the dynamo.

2. A dynamo and its exciter mechanically connected, a source of potential independent of the dynamo, and two sets of electrically displaced brushes for the exciter, whereof one set is connected to the source of potential and whereof the other is connected to the field windings of the dynamo.

3. A dynamo, a variable speed driving source for said dynamo, an exciter, means for driving the exciter at a speed proportional to that of the dynamo, a source of constant potential independent of the dynamo, and two sets of electrically displaced brushes for the exciter, whereof one set is connected to the source of constant potential and whereof the other is connected to the field windings of the dynamo.

4. A dynamo, a variable speed driving source for said dynamo, an exciter, means for driving the exciter at a speed proportional to that of the dynamo, a source of potential independent of the dynamo, and two sets of electrically displaced brushes for the exciter, whereof one set is connected to the source of potential and whereof the other is connected to the field windings of the dynamo.

5. In combination a commutator, two sets of brushes bearing upon said commutator, independent electrical circuits connecting the opposite brushes of each set, means including a magnetic circuit and windings connected to the commutator for producing between the opposite brushes of each set an electro-motive-force determined by the current in the circuit connecting the other set, a dynamo having field windings connected in series with one of said circuits, a source of electro-motive-force independent of said dynamo included in the other circuit, and means for producing relative rotation of brushes and commutator proportional to the speed of the dynamo.

6. In combination, a dynamo having appropriate field windings, a magnetic circuit all parts of which are relatively fixed, a winding in inductive relation to the magnetic circuit, a commutator for said winding, a source of direct current electro-motive force independent of the dynamo, two sets of electrically displaced brushes bearing upon said commutator, whereof one set is connected to the source of direct current electro-motive-force and whereof the other is connected to the field windings of the dynamo, and means for producing relative rotation of brushes and commutator proportional to the speed of the dynamo.

In testimony whereof I have hereunto signed my name.

JOSEPH LESTER WOODBRIDGE.

Witnesses:
J. H. TRACY,
H. A. TROUTMAN.